A. L. STEWART AND E. C. HEAD.
GEAR PLANING MACHINE.
APPLICATION FILED JUNE 21, 1920.
1,394,586.
Patented Oct. 25, 1921.
15 SHEETS—SHEET 1.
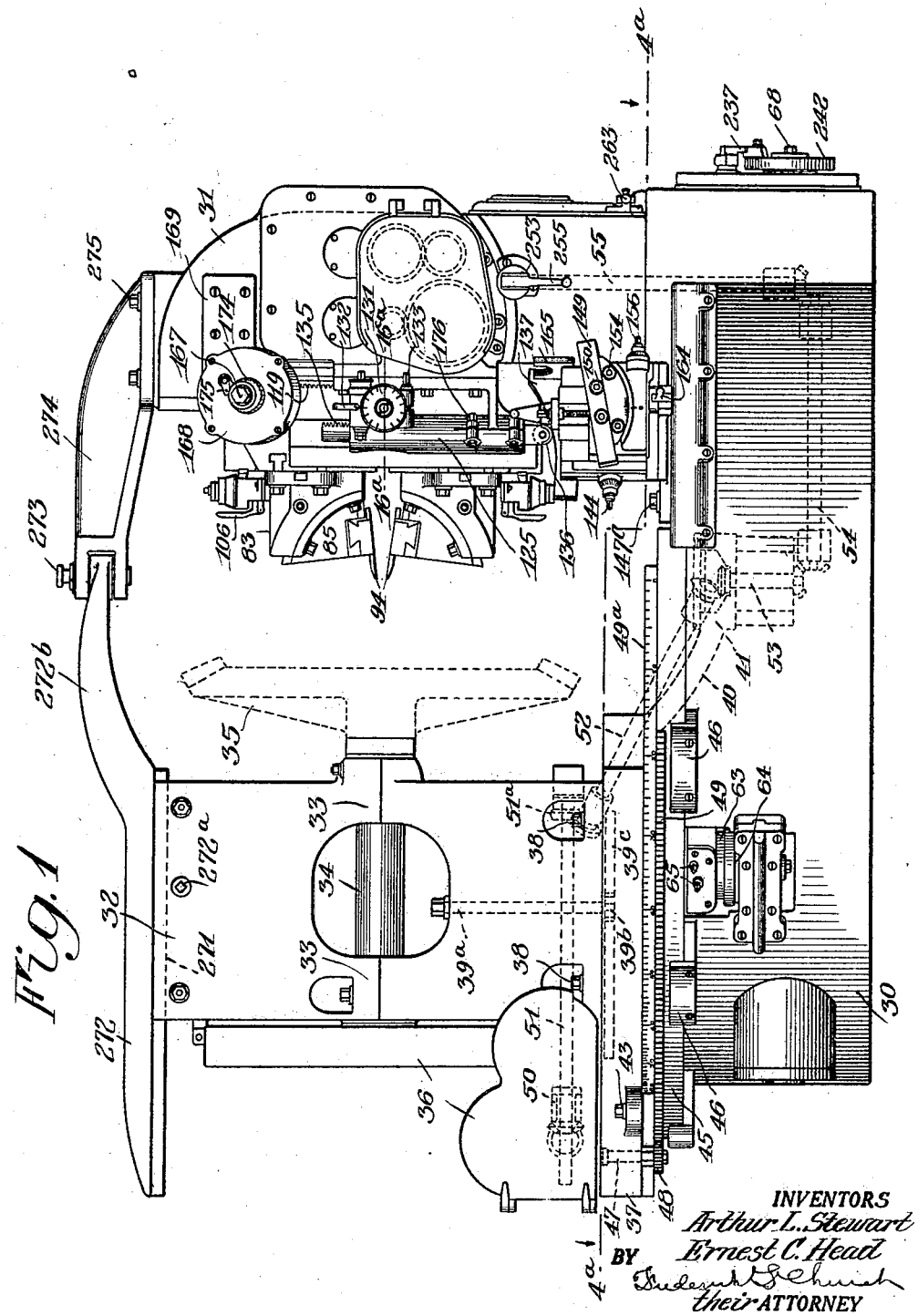
INVENTORS
Arthur L. Stewart
Ernest C. Head
BY
their ATTORNEY

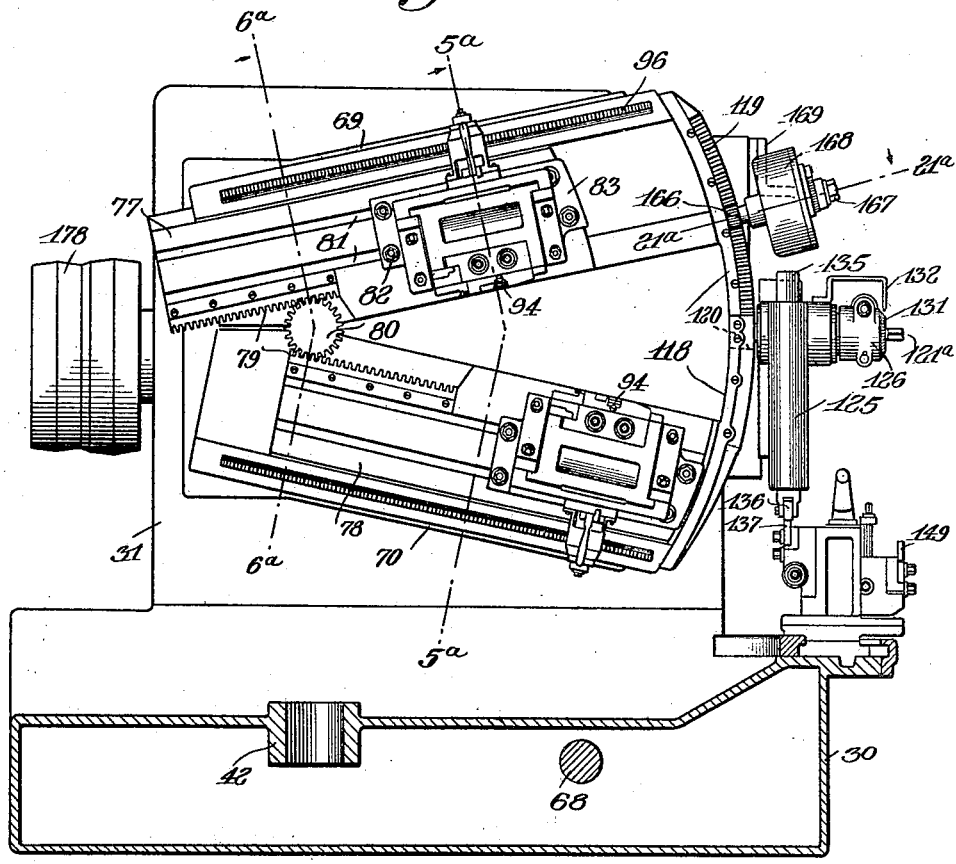

A. L. STEWART AND E. C. HEAD.
GEAR PLANING MACHINE.
APPLICATION FILED JUNE 21, 1920.

1,394,586.

Patented Oct. 25, 1921.
15 SHEETS—SHEET 3.

INVENTORS
Arthur L. Stewart
BY Ernest C. Head
their ATTORNEY

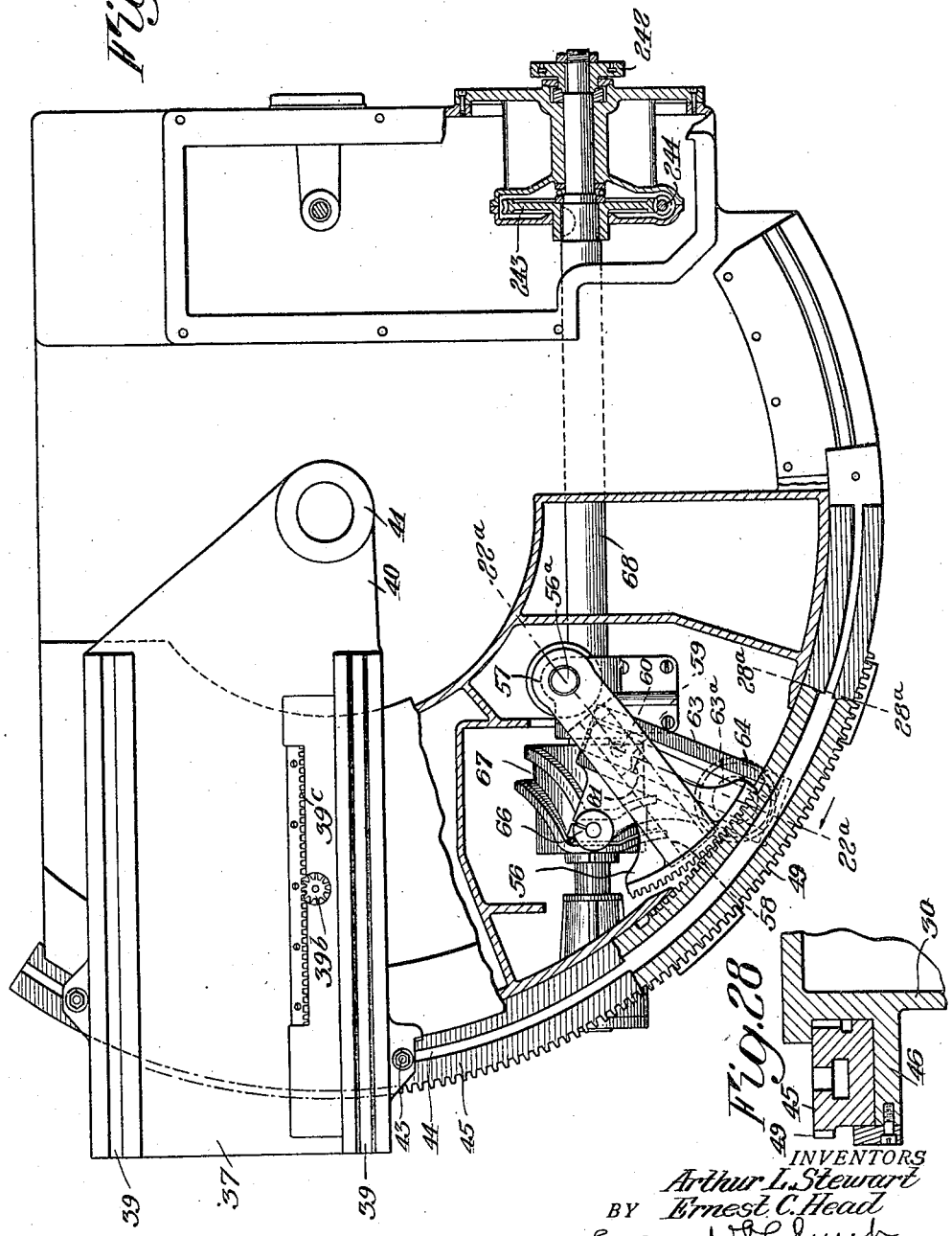

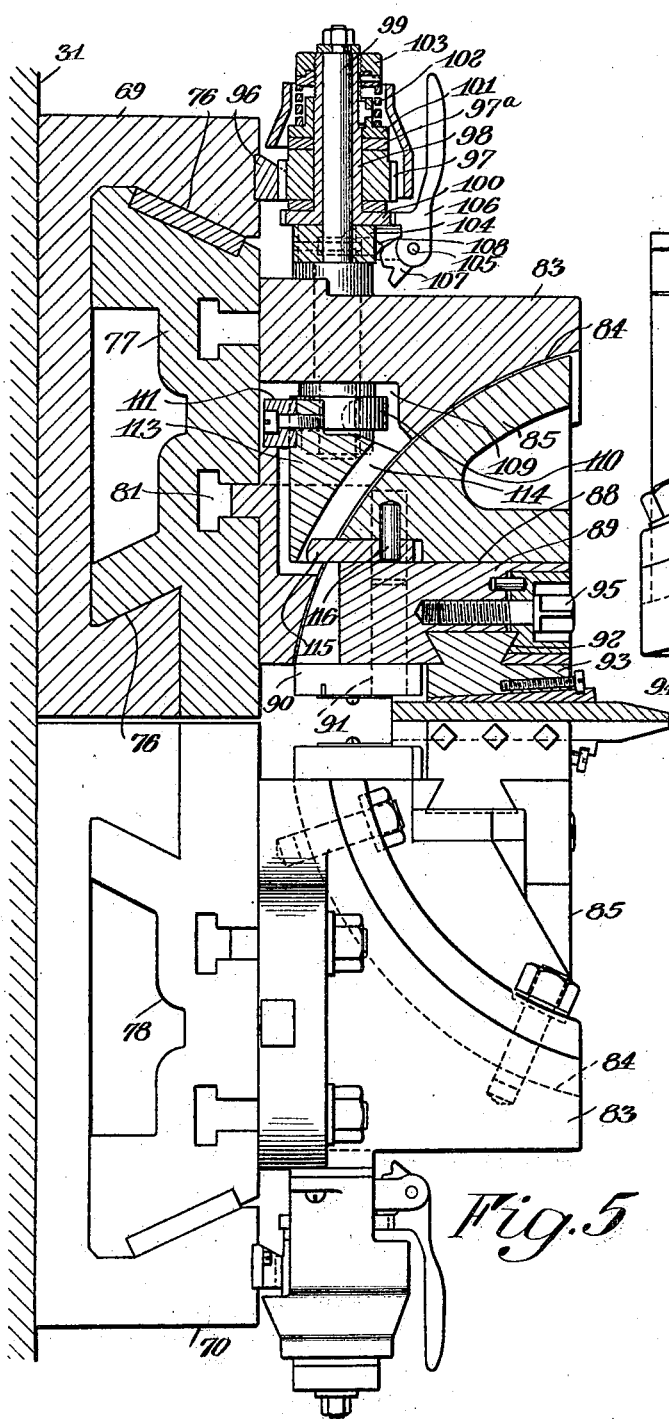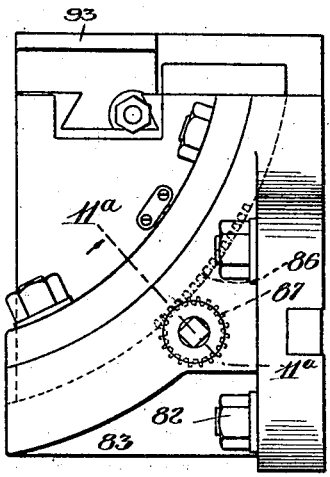

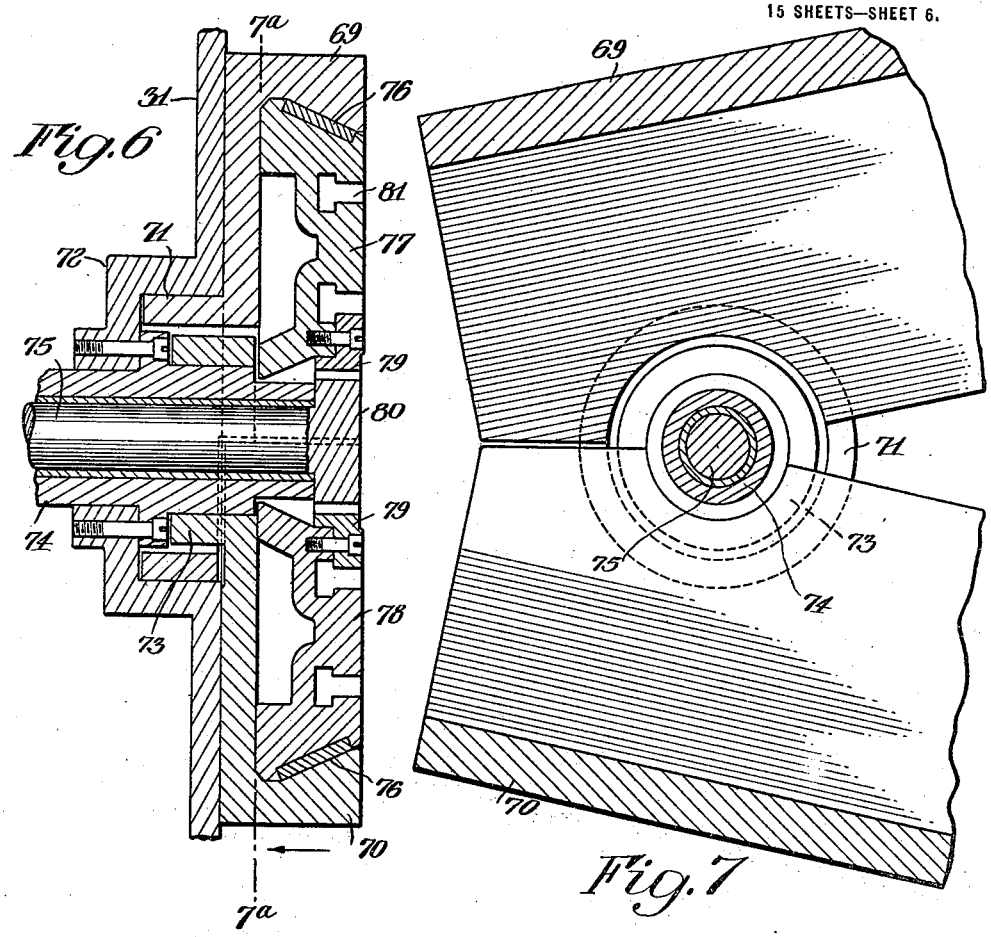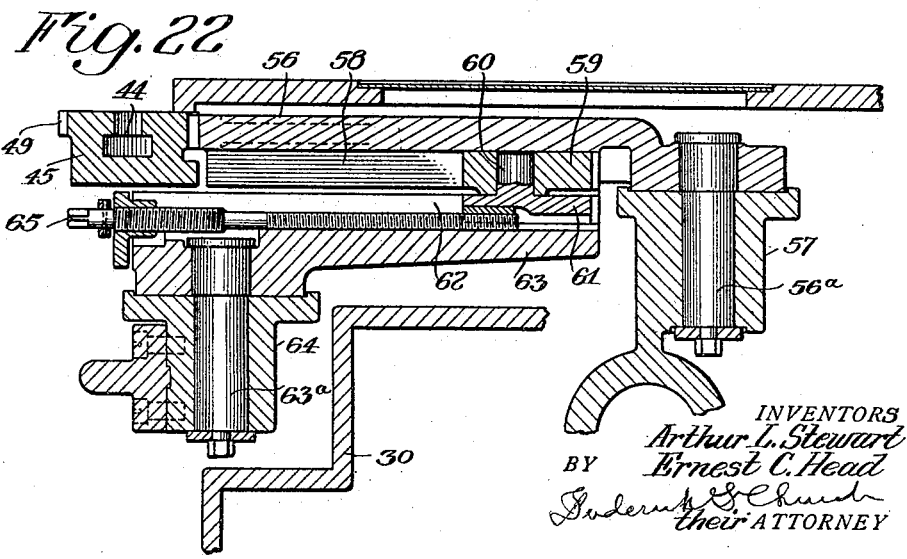

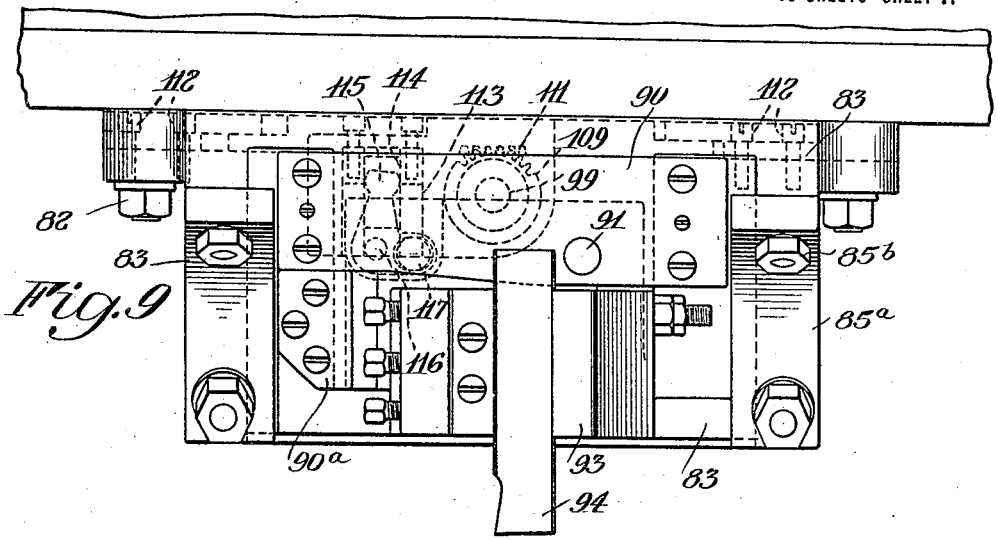
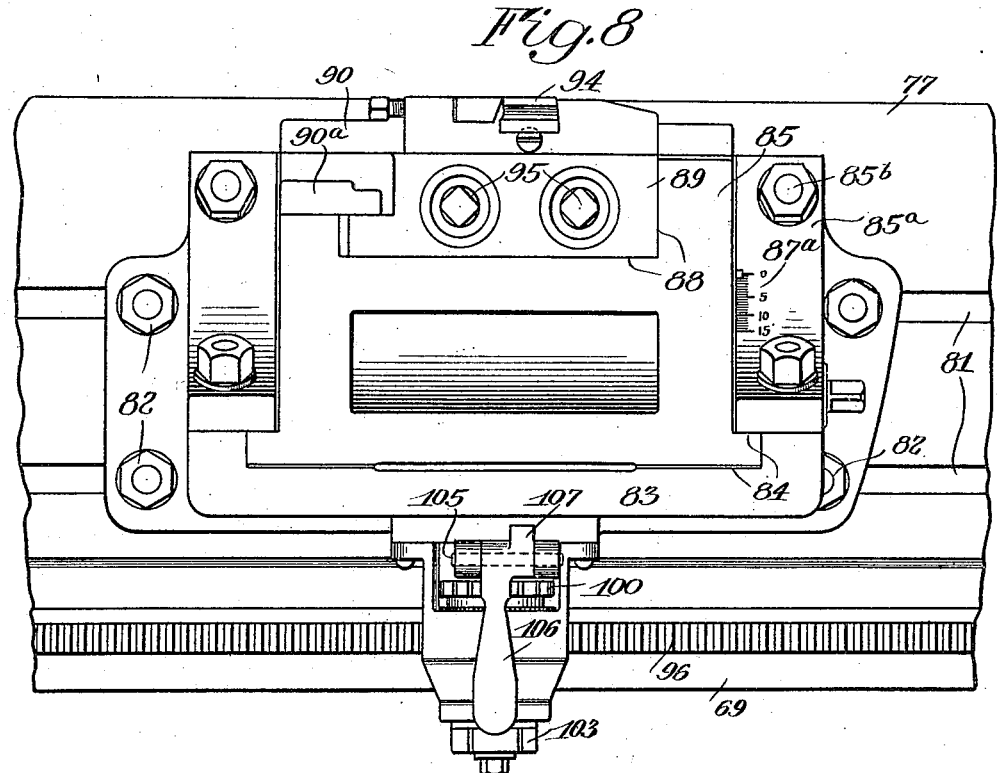

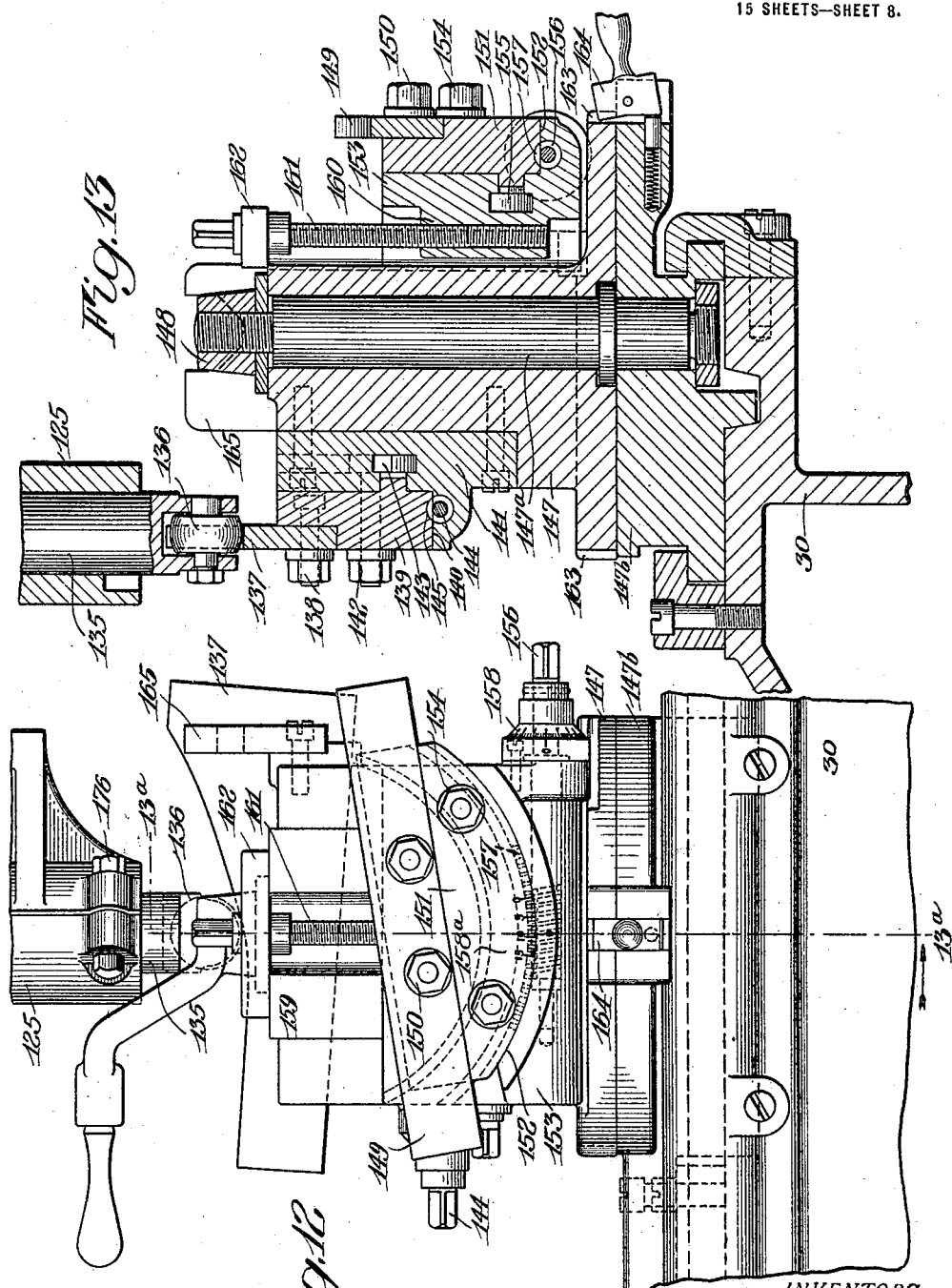

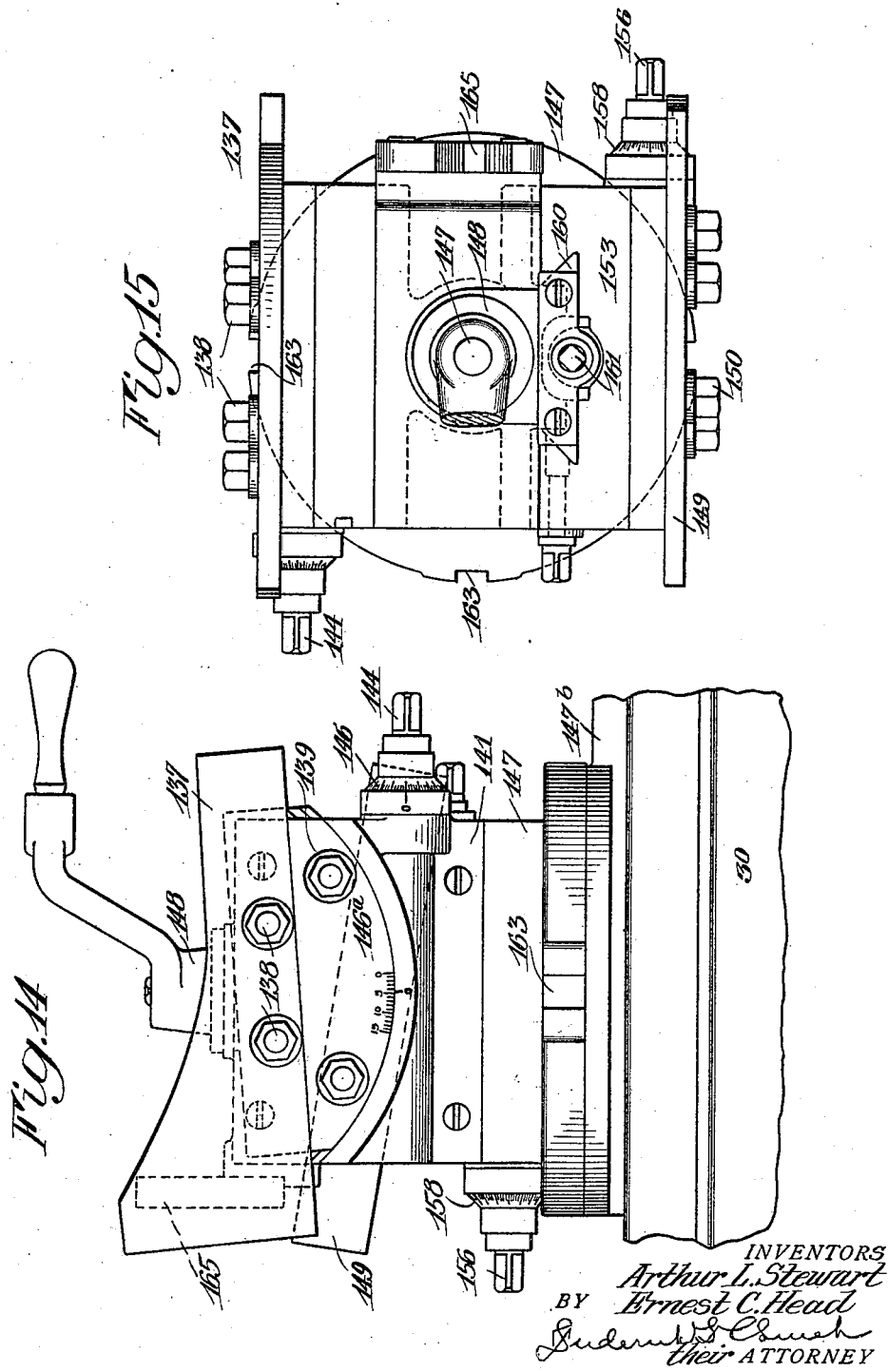

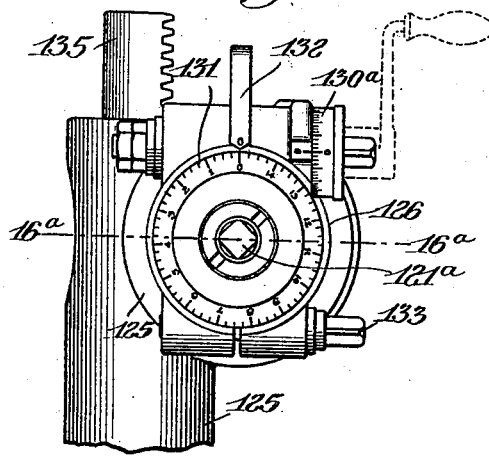
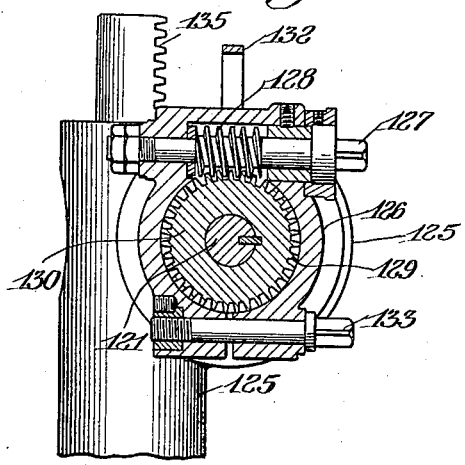
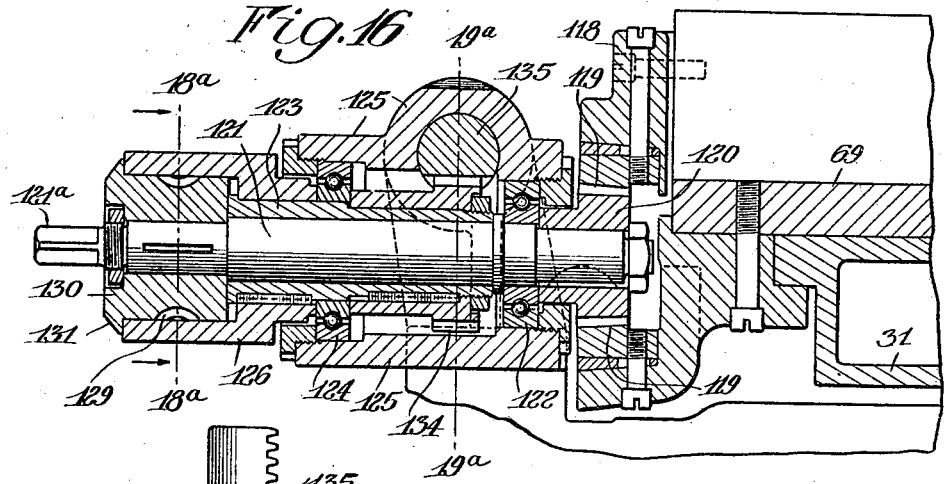
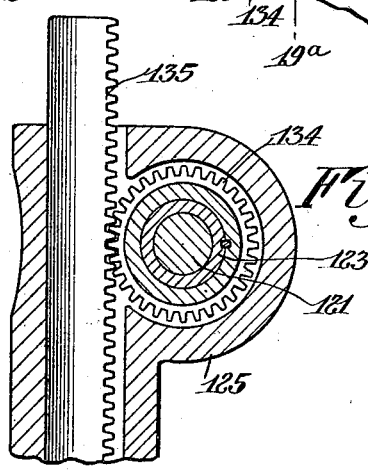

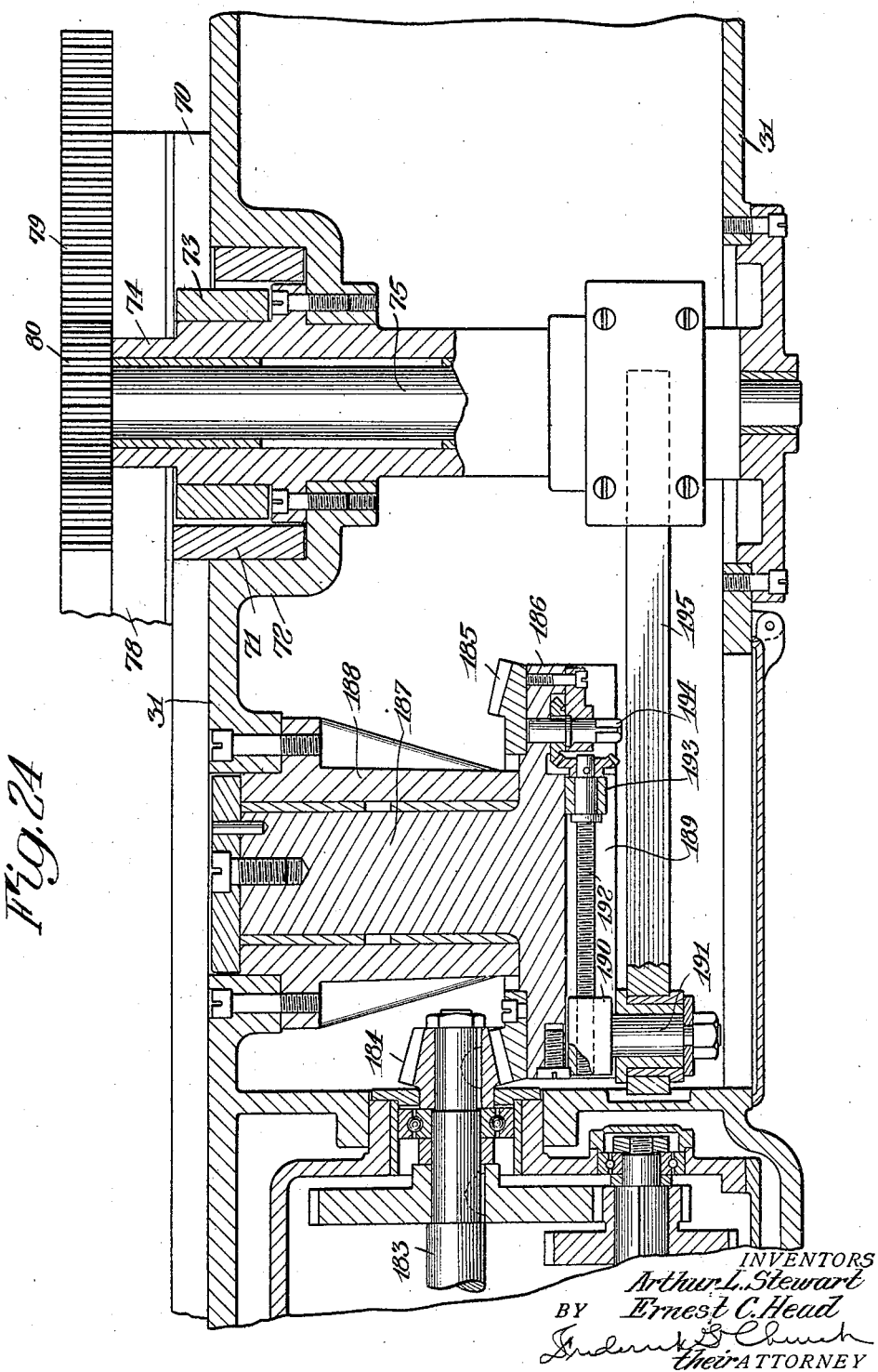

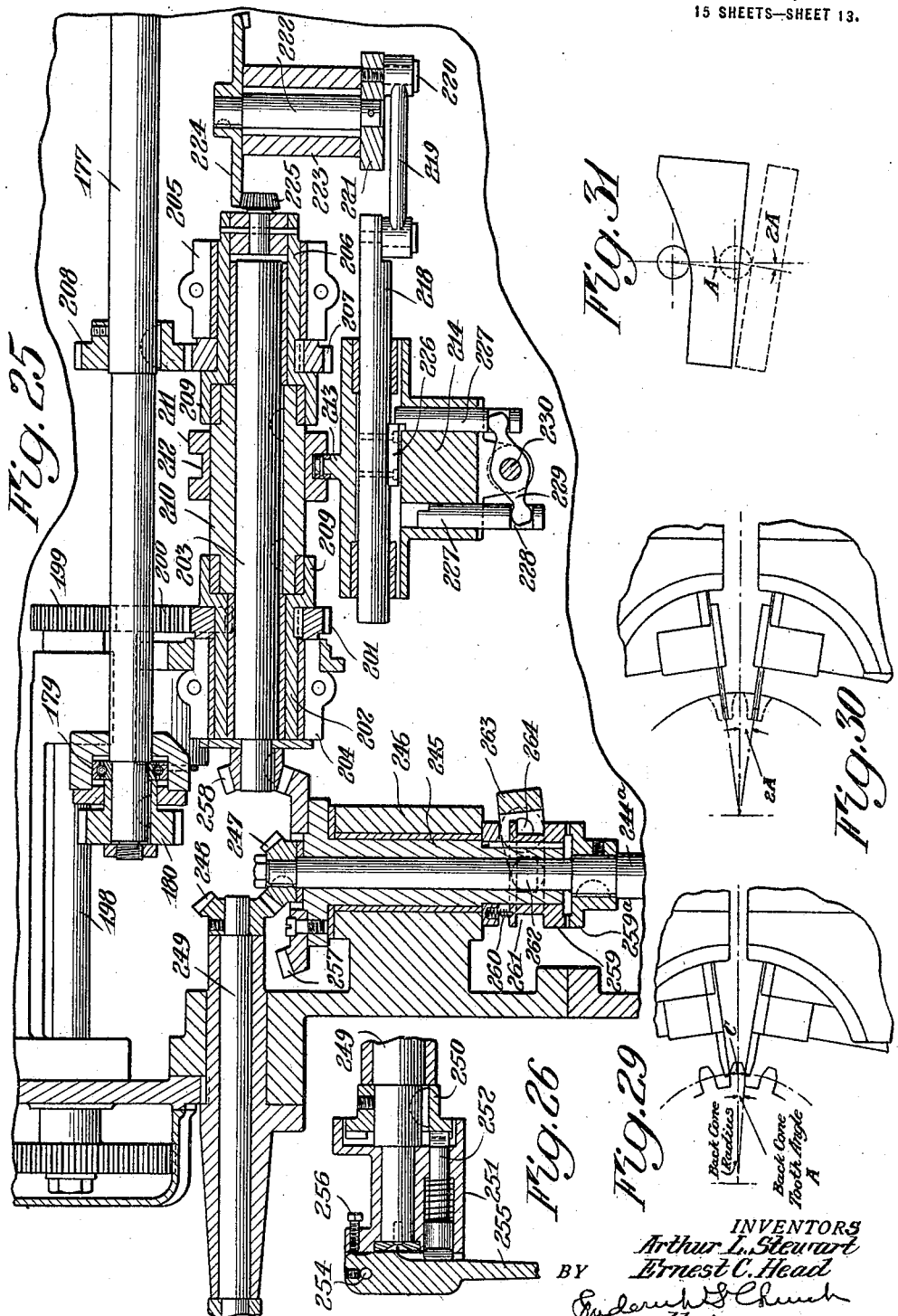

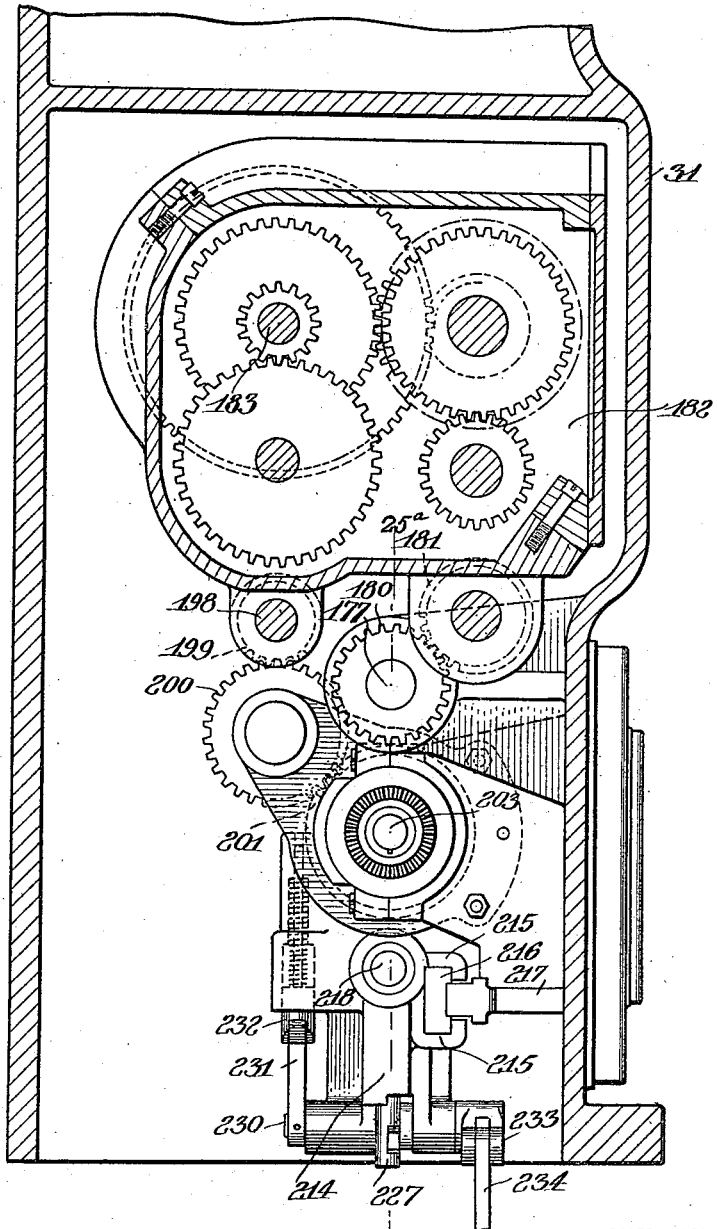

A. L. STEWART AND E. C. HEAD.
GEAR PLANING MACHINE.
APPLICATION FILED JUNE 21, 1920.
1,394,586.
Patented Oct. 25, 1921.
15 SHEETS—SHEET 15.
Fig.32
Fig.33
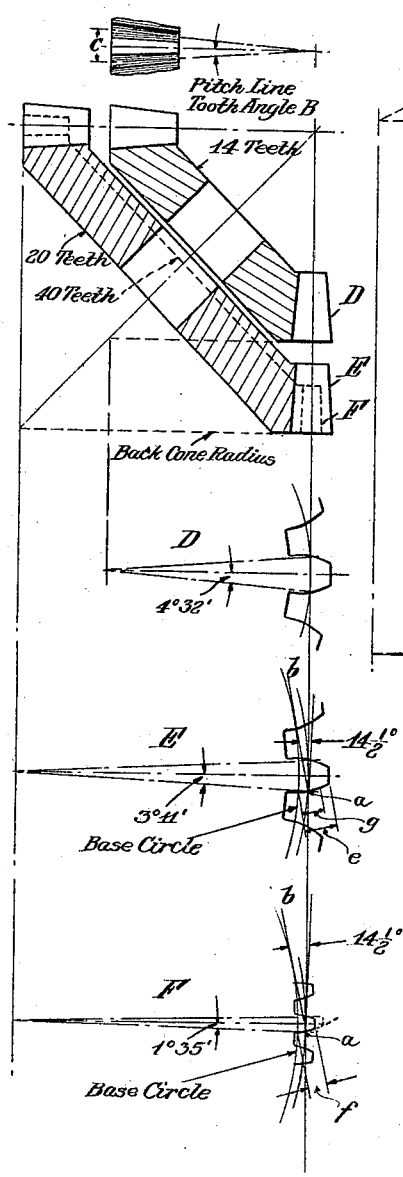
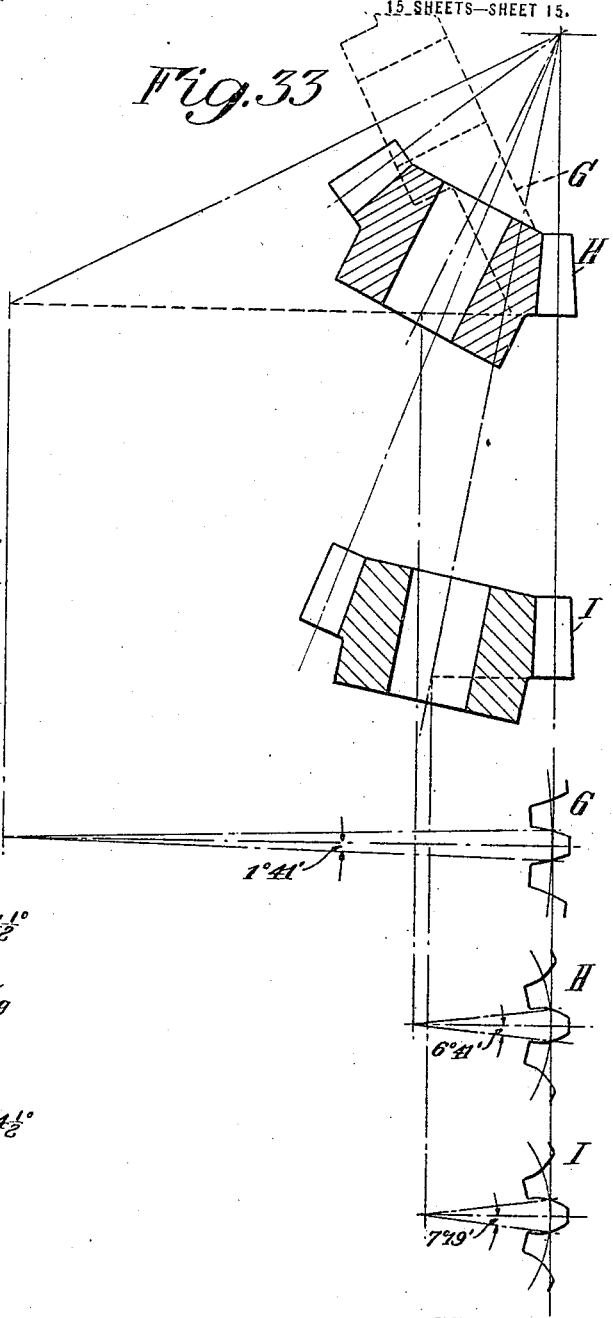
INVENTORS
Arthur L. Stewart
BY Ernest C. Head
their ATTORNEY

UNITED STATES PATENT OFFICE.

ARTHUR L. STEWART AND ERNEST C. HEAD, OF ROCHESTER, NEW YORK, ASSIGNORS TO GLEASON WORKS, OF ROCHESTER, NEW YORK, A CORPORATION OF NEW YORK.

GEAR-PLANING MACHINE.

1,394,586.         Specification of Letters Patent.     Patented Oct. 25, 1921.

Application filed June 21, 1920. Serial No. 390,363.

*To all whom it may concern:*

Be it known that we, ARTHUR L. STEWART and ERNEST C. HEAD, citizens of the United States, residing at Rochester, in the county of Monroe and State of New York, have invented certain new and useful Improvements in Gear-Planing Machines; and we do hereby declare the following to be a full, clear, and exact description of the same, reference being had to the accompanying drawings, forming a part of this specification, and to the reference numerals marked thereon.

This invention relates to gear cutting machines of the form controlled planer type, the main object of the invention being to provide a machine of the character described for accurately and rapidly cutting gears of a wide range of dimensions, with the use of a minimum number of forms, together with various advantageous features of arrangement and operation contributing to the convenience and efficiency of machines of this type. To these and other ends the invention resides in certain improvements and combinations of parts, all as will be hereinafter more fully described, the novel features being pointed out in the claims at the end of the specification.

In the drawings:

Figure 1 is a front elevation of a machine embodying the invention with the blank support swung away from the tools;

Fig. 2 is a section on the line $2^a$—$2^a$ of Fig. 3 showing the tool support;

Fig. 3 is a top plan view of the machine;

Fig. 4 is a section on the line $4^a$—$4^a$ of Fig. 1 showing the blank feeding means.

Fig. 5 is an enlarged section on the line $5^a$—$5^a$ of Fig. 2.

Fig. 6 is an enlarged section on the line $6^a$—$6^a$ of Fig. 2.

Fig. 7 is an enlarged section on the line $7^a$—$7^a$ of Fig. 6.

Fig. 8 is an enlarged elevation of the lower tool carrier.

Fig. 9 is an enlarged top plan view of the same.

Fig. 10 is an enlarged end elevation of the lower tool carrier with the tool removed as viewed from the right of Fig. 8.

Fig. 11 is a section on the line $11^a$—$11^a$ of Fig. 10.

Fig. 12 is an enlarged front elevation of the form carrier.

Fig. 13 is a section on the line $13^a$—$13^a$ of Fig. 12.

Fig. 14 is a rear elevation of the form carrier.

Fig. 15 is a top plan view of the same.

Fig. 16 is an enlarged horizontal section, on the line $16^a$—$16^a$ of Fig. 1, showing the gearing connecting the forms and tool guides.

Fig. 17 is a front elevation of the same.

Fig. 18 is a section on the line $18^a$—$18^a$ of Fig. 16.

Fig. 19 is a section on the line $19^a$—$19^a$ of Fig. 16.

Fig. 20 is an enlarged front elevation of the tool guide counterbalance.

Fig. 21 is an enlarged section on the lines $21^a$—$21^a$ of Figs. 2 and 20;

Fig. 22 is an enlarged section on the line $22^a$—$22^a$ of Fig. 4;

Fig. 24 is an enlarged section on the line $24^a$—$24^a$ of Fig. 23 showing mechanisms for reciprocating the tool carriers;

Fig. 25 is an enlarged vertical section substantially on the line $25^a$—$25^a$ of Fig. 27 showing means for reversing and controlling the feeding mechanism;

Fig. 26 is a fragmentary sectional view of the hand lever controlling the clutch shown in Fig. 25;

Fig. 27 is an enlarged section on the line $27^a$—$27^a$ of Fig. 23;

Fig. 28 is a fragmentary sectional view on the line $28^a$—$28^a$ of Fig. 4.

Figs. 29, 30 and 31 are diagrammatic views illustrating the method of operation of the machine;

Fig. 32 is a diagrammatic view illustrating variations of the profile shape of teeth of bevel gears of different dimensions having the same pitch cone angle;

Fig. 33 is a similar view but for gears having different pitch cone angles.

Similar reference characters throughout the several views indicate the same parts.

Figure 23:
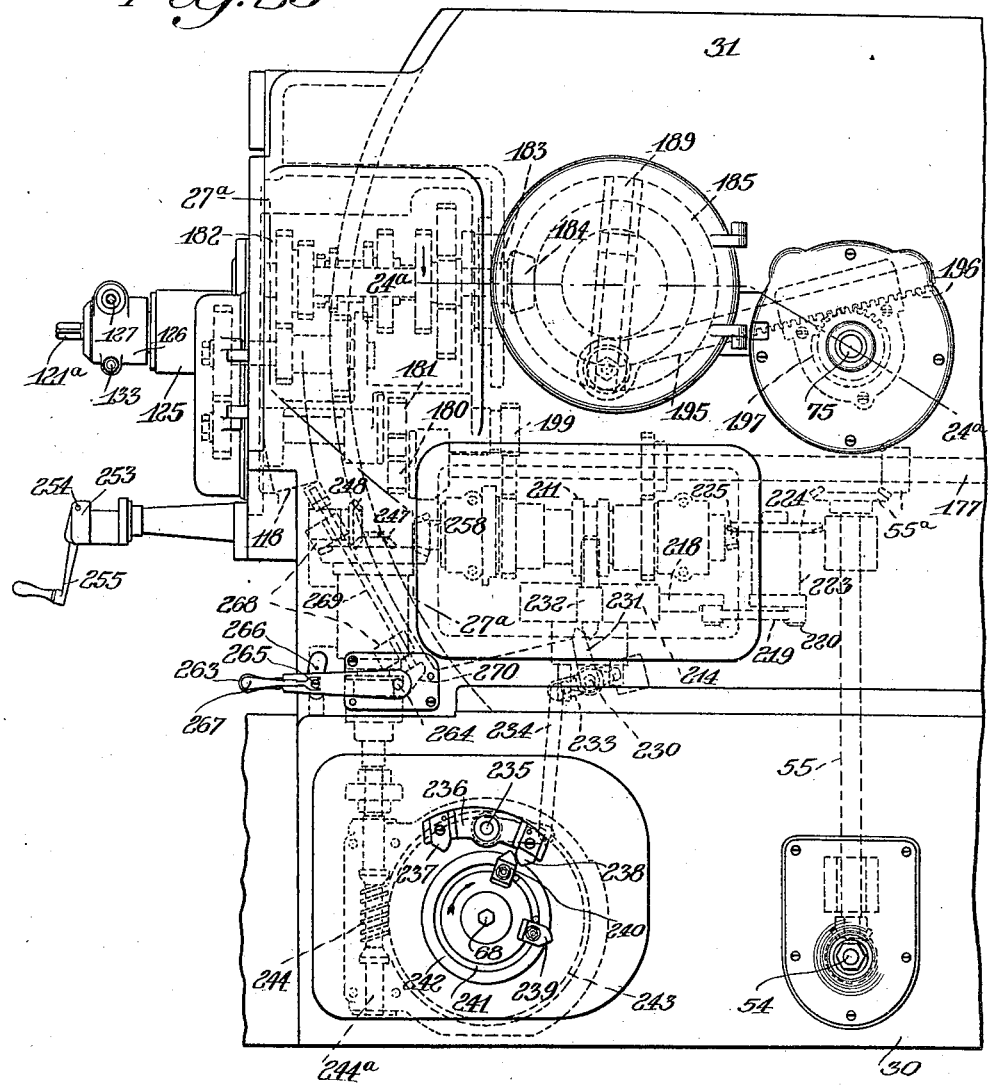
Fig. 23 is an enlarged exterior elevation of a portion of a tool supporting and operating means as viewed from the right in Fig. 1 with the operating parts shown generally in dotted lines.

This invention has to do with machines of the so-called planer type for cutting gear teeth with form controlled tools having a reciprocating cutting movement. Such machines have been used with a single reciprocating tool arranged to cut substantially in the plane through the blank axis parallel with the direction of feeding movement or, in other words, in the horizontal central plane of the machine, the blanks being successively indexed to bring each tooth face to this plane for the cutting operation thereon. Such machines, however, having but a single tool, have proved objectionably slow in operation. Similar machines have also been employed having two tools, instead of one, operating simultaneously on different tooth faces on opposite sides of the central plane of the machine, but while such machines are speedier in operation than single tool machines, the off-center arrangement of the tools has been compensated for by the use of a different controlling form for each variation in the number of teeth to be cut in the blank, in addition to the different forms required by variations in the pitch cone angles and pitch diameters of bevel and spur gears, respectively, so that for accurate work the number of forms required has been impracticably large.

It has been found, however, that while variations in the pitch cone angle or in the pitch diameter of the bevel or spur gear blank, respectively, may require the provision and substitution of a limited number of forms of correspondingly varied profile, with bevel gear blanks having the same pitch cone angle and spur gears having the same pitch diameter, the same form may be employed and variations in the other dimensions of the blank, as for example, in the number of teeth, may be provided for by adjusting the position, or tilting, the same form. More specifically, therefore, an object of the invention is to produce a practical machine of this type having a plurality of tools operating at the same time to accurately cut different tooth faces, while reducing the number of forms or templets required and thereby reducing the cost and simplifying the operation of the machine, and also to provide an efficient arrangement whereby one form is conveniently employed to control a plurality of tools. The invention also provides various other advantageous features of construction, arrangement and mode of operation which will be made clear by the following detailed description.

The embodiment of the invention at present preferred as best illustrating its principles and mode of application comprises a bevel gear cutting machine and there is preferably provided a base 30 of the shape shown in Figs. 1, 2 and 3, on which is carried at one side a tool supporting standard 31, opposite which is a work or blank supporting standard 32, one of these supports or standards being movable on the base about its center toward and from the other to effect relative feeding movement of the work and tools. The work support is provided with bearings 33, Fig. 1, in which is journaled a blank spindle 34 detachably carrying at its inner end the bevel gear blank 35. At its opposite or outer end the blank spindle has connected therewith an indexing mechanism indicated generally at 36. The latter is of any well known or suitable construction for intermittently rotating the blank through the space of one or more teeth to index the same between cutting operations, and as this mechanism forms no part of the present invention and is well known in the art further description thereof is deemed unnecessary.

Work support 32 is preferably adjustably carried on a swinging plate or bed 37 being secured thereto by means of bolts 38 engaging at their lower ends in T slots 39 in the bed on which are suitable bearing surfaces permitting the work support, under the control of said bolts, to be adjustably slid longitudinally of bed 37 toward and from the center of the machine. A spindle $39^a$ rotatably mounted on the work support carries at its lower end a pinion $39^b$ meshing with a rack $39^c$ on bed 37. Spindle $39^a$ is turned by means of a suitable wrench for sliding the work support longitudinally of the bed after which the support is clamped to the bed by means of bolts 38. Bed 37 has at its inner end an extension 40 provided with the bearing 41 engaging a similar bearing 42 on the base 30 at the center of the machine, so that the bed is guided to have a pivotal movement about the center of the machine. The blank may thus be so positioned that its pitch cone apex is always at the center of the machine. The base 30 is formed with annular bearing surfaces $42^a$, Fig. 3, concentric with the bearings 41 and 42, on which bed 37 is slidably supported and the latter carries adjacent its bottom, bolts 43 having their heads engaged in a T slot 44 in an arcuate rail 45 supported on brackets 46, Fig. 1, on base 30. Rail 45 is formed on circumferential lines drawn about the center of the machine and is movable on the base relatively to work bed 37 to which, however, it may be clamped in suitably adjusted relation by means of bolts 43. Bed 37 carries a rotary spindle 47 having fixed on its lower end a pinion 48 meshing with teeth 49 on the outside of rail 45. The latter is oscillated by suitable mechanism to effect feeding movement of the work bed, and by rotating spindle 37 by means of a suitable tool or wrench, the work bed and support may be rotatably adjusted about the center of the machine to a desired position relatively to rail 45, and then clamped thereto by bolts 43, a scale $49^a$ being provided on the base to indicate such angular position of the work support.

The blank indexing mechanism referred to above is operated by means of a bevel gear 50 meshing with a similar gear of the indexing mechanism and fixed on a shaft 51 rotatably carried in the work support frame. This shaft is connected by means of bevel gears 51ª with a shaft 52 carried by the work support and the extension 40 of the latter with its inner end adjacent the center of the machine and connected by bevel gears with the short vertical shaft 53 at the center of the machine about which shaft 52 rotates. Shaft 53 is connected by bevel gearing with spindle 54 rotatable in the base 34 and in turn connected by gearing with the vertical spindle 55 connected with and driven by the main driving shaft by bevel gears 55ª, whereby movement is transmitted to the indexing mechanism for indexing the blank in all positions of the latter about the center of the machine.

As apparent from the construction already described and from the drawings, the work spindle extends radially of the center of the machine about which the work support carrying the spindle is rotatable, and the latter is adjustable in a radial direction toward and from the center of the machine to bring the apex of the pitch cone of the blank into registry or vertical alinement with the machine center. As later appears the tools have a reciprocating movement toward and from the cone apex and the feeding of the tools and work is preferably accomplished by swinging the blank about the machine center toward and from the tool although, of course, with suitable arrangements the tool support could, equally well, be swung about the same center toward and from the blank for this purpose.

The means for feeding the blank toward and from the tools comprises preferably a lever 56, Fig. 4, provided at its outer end with a segmental rack the teeth of which mesh with teeth formed on the inner circumference of the rail 45. The lever is pivotally carried at its inner end by a spindle 56ª in a bearing 57 on the base, the underside of the lever having formed therein a longitudinal slot 58 in which slides a block 59. The latter is provided with a bearing in which rotatably engages a trunnion 60 on a block 61 sliding in a slot 62 in the upper side of a lever 63 rotating at its outer end on a spindle 63ª carried in a bearing 64 on the base. A spindle 65 carried by the lever has threaded engagement with block 61 for adjusting the latter longitudinally of the lever to vary the extent of feeding throw of the work support. Lever 63 is formed with a lateral extension in which is carried a roller 66, engaging in a cam slot extending circumferentially about a cam 67 fixed on a shaft 68 rotated in the direction of the arrow shown in Fig. 23 by means to be described later. It is apparent that rotation of this shaft and cam oscillates lever 63 and the latter, through the connecting blocks 59 and 61, oscillates lever 56 through a range of movement adjustable by means of the screw 65. The movement of lever 56, of course, oscillates rail 45 and thus swings the gear blank toward and from the tools moving it toward the tools during the cutting operation, retracting it rapidly as a tooth is completed so that the blank may be indexed by means of the mechanism described above.

The tool support is of the substantially rectangular form shown in the drawings having preferably a substantially plane shaped wall adjacent the center of the machine on which are pivotally supported upper and lower tool guides 69 and 70, respectively, the guides being elongated in shape and having slotted surfaces supporting and guiding the tool carriers in their reciprocating cutting movement. The axis of pivotal support of the guides is in alinement with the pitch cone apex so that the tools on the carriers move in lines passing through the apex. The upper guide 69 carries a bearing ring 71, Figs. 6 and 7, fitting in a bearing boss 72 on the support. The lower slide 70 carries a bearing ring 73 rotatably supported on a sleeve 74 bolted to the support and serving as a bearing for a shaft 75. Each guide is formed with a dove-tailed slot 76 provided with bearing surfaces in which slots reciprocate the upper and lower tool carriers 77 and 78, respectively. The latter are provided with racks 79 meshing on opposite sides with a pinion 80 on shaft 75 as presently to be described. Shaft 75 is oscillated by suitable means and thus serves to reciprocate the tool carriers simultaneously longitudinally of their guides in opposite directions.

The tool carriers have formed therein T slots 81 and on each carrier is secured, by means of bolts 82 engaging in the slots, a tool head 83. As the latter are the same for both tool carriers a description of one will suffice for both.

Tool head 83 has formed therein an arcuate guideway 84, concentric with the cutting end of the tool, for adjusting the latter angularly as if about an element of the pitch cone of the blank as an axis to provide clearance for the tool in cutting. Adjustably fitted in this guideway is a segmental tool block 85 retained in place by arcuate plates 85ª clamped to the head by means of bolts 85ᵇ. The block is provided on its arcuate surface with rack teeth 86 with which meshes a pinion 87 on a short spindle carried by the tool head and rotatable by means of a wrench or other tool for angular adjustment of the block in the head in the manner described as indicated on a scale 87ª, Fig. 8, marked on one of the plates 85ª of the head, the block having a suitable index coöperating with the scale. The tool block is cut away as at 88 to receive a tool post 89 which is movably retained in its recess in the block by means of securing plates 90 and 90ᵃ. The tool post is somewhat smaller than and hence movable in its recess to allow the tool to be retracted on its back stroke to clear the work and to this end the post is pivotally supported by means of a spindle 91 carried by the block. Means presently to be described are provided for moving the tool post in and out about spindle 91 for the purpose indicated. Each post has formed therein a dove-tailed slot 92 with which engages a corresponding projection on the tool clamp 93 in which latter the tool 94 is secured by screws and wedges in the usual manner. A screw 95 is provided to bind the tool clamp in the post after adjustment.

The means for moving the tool post in and out to clear the work on the back stroke comprises preferably a rack 96 on the tool guide Figs. 2 and 5, with which meshes a pinion 97 rotating on a sleeve 98 carried by a spindle 99, the sleeve having at its lower end a flange 100 provided circumferentially with clutch teeth. Pinion 97 has on either side thereof suitable frictional material 97ᵃ and is adapted to be frictionally and yieldably secured to the sleeve by means of a flanged bushing 101 sliding on the sleeve and pressed toward the pinion by means of a spring 102, the tension of which is adjusted by a nut 103 threadedly engaging the end of the sleeve. Fixed on spindle 99 below flange 100 of the sleeve is a collar 104 carrying a pin 105 on which is pivotally supported a lever 106 having a notched extension 107 coöperating with a spring-pressed plunger 108. The lever is provided with a tooth which in one of its positions engages with the teeth of flange 100 for securing the sleeve to the spindle. When the upper end of the lever is pulled outwardly, however, its notched extension, coöperating with plunger 108, retains it in such position out of engagement with the sleeve so that the latter rotates idly on the spindle. When the sleeve is locked to the spindle in the manner indicated, the reciprocating movement of the tool carrier causes rotation of the pinion 97 first in one direction and then the other transmitting motion to the tool post for moving the tool to clear the work on the back stroke. The movement of the tool post is limited by engagement with the sides of its recess in the tool block and when its motion is thus arrested pinion 97 is allowed by its frictional and yielding engagement with sleeve 98 to slip idly on the latter, thus transmitting only sufficient force to swing the tool post. Spindle 99 rotates in a bearing in head 83 and extends at its lower end into a recess 109 in the head where it is provided with a pinion 110 meshing with a rack 111 supported for longitudinal sliding movement on head 83 by means of bolts 112 with which a slotted portion of the rack coöperates. The rack has bolted thereto at one end a lug 113, one face of which extends adjacent to and conforms with the arcuate surface of block 85, lug 113 having formed therein an arcuate slot 114 the sides of which embrace a short lever 115 pivotally carried by a pin 116 in the block, the arrangement being such that the lever is in engagement with the slot of the lug in all positions of adjustment of the block. Lever 115 has a lateral extension provided with an opening embracing a pin 117 carried by tool post 89.

It is apparent from this construction that during the backward stroke of the tool, rack 96 on the guide, through the connections described including lever 115 on the tool block, swings the tool post about its pivot 91 inwardly of the tool head 83 so that the tool does not engage with the work, movement in this direction being limited by engagement of the tool post with the sides of the recess in the head in which it is carried. At the beginning of the cutting stroke the mechanism described returns the tool to cutting position in which it is also supported by the sides of the recess so as to properly cut the work, the actuating mechanism yielding by slippage of gear 97 as the tool post reaches the extreme of its movement in either direction.

The means for swinging the tool guides about their supporting shaft 75, for adjusting the tools at the beginning of an operation as well as for controlling them during the cutting action to produce the desired tooth profile, comprises preferably arcuate bars 118 secured to the outer ends of the tool guides and projecting therefrom so as to overlap each other with a space therebetween. These bars are concentric with the center about which the guides swing and are provided on their adjacent sides with rack teeth 119 for simultaneous engagement on opposite sides with a pinion 120 fixed on the inner end of the shaft 121, Fig. 16, supported in a bearing 122 and also in a sleeve 123 provided with a similar bearing 124, which bearings are carried by an extension 125 of the tool support. Keyed to the outer end of sleeve 123 is a rotary housing 126 in the upper part of which, Fig. 18, is rotatably supported a shaft 127 having fixed thereon a worm 128 meshing with a worm gear 129 on a hub 130 fixed on the outer end of shaft 121. The hub is provided with a scale 131 with which coöperates an index 132 on the tool support for indicating the position of rotary adjustment of shaft 121 with relation to the support. Housing 126 is split at the bottom where it is connected by means of a clamping screw 133 for clamping the same on hub 130 after adjustment of the latter by means of shaft 127. Sleeve 123 has fixed on its inner end a gear 134 meshing with a rack bar 135 sliding vertically in a guideway in the fixed tool support extension 125. Rack 135 carries a roller or follower 136 at its lower end for coöperation with the templet means, or form, which controls the tools so as to shape the tooth.

As is evident from the above construction, rotation of shaft 121 by means of its gear 120 meshing with the racks on opposite sides thereof carried by the pivoted tool guides serves to swing the latter simultaneously in a vertical plane about their pivotal shaft 75 in opposite directions and to an equal extent.

With rack bar 135 supported at its lower end by the form means described below, housing 126 may be unclamped from spindle 121 and the latter rotated by means of worm shaft 127 to adjust the tool guides to make any desired angle with the horizontal central plane of the machine independently of the rack bar 135. When housing 126 is clamped to shaft 121, however, by means of the screw spindle 133 further movement of the spindle and of the tool guides is controlled by the vertical movement of the rack 135 which in turn is controlled by the form or templet.

As the present machine is intended for for both roughing out and finishing the gear blank, it is provided with forms for both purposes, a single form of each variety being employed for simultaneously controlling both tools in cutting a given gear. The roughing form used first is preferably a straight-edged bar on which roller 136 rests and which is movable relatively to the latter for moving rack 135 vertically and thereby controlling the movement of the tools toward and from each other during the roughing cut. The finishing form, which may be brought into similar coöperation with roller 136 after the blank has been roughed out, is designed in the usual and well known manner for controlling the movement of the tools during the cutting operation to produce the proper involute curvature of the tooth profile. Different finishing templets are selectively employed for cutting blanks having different pitch cone angles but it has been found that a limited number of such forms, each designed for finishing teeth corresponding to a range of several degrees variation in the pitch cone angle, are sufficient for cutting the angles met with in practical work and are sufficiently accurate when thus used for all practical purposes. As already stated, it has been found that for gear blanks of the same pitch cone angle, variations in the direction of curvature of the tooth face, i. e., in the angular relation of the curved tooth face to the radius of the back cone through the center of the tooth, due to variations in dimensions, as for example in the number or thickness of the teeth, may be accommodated by adjusting the positions of the forms.

For supporting both roughing and finishing forms so that they may be alternately employed for either operation and adjusted to the position required by the particular gear being cut, there is provided a form carrier secured to the end of the feed rail 45 and movable with the latter during the feeding movement of the blanks for producing vertical movement of rack 135 during each cutting operation. The finishing form is indicated at 137, Figs. 12 to 15 inclusive, detachably supported by means of screws 138 on a segmental plate 139 supported on and guided by an arcuate surface 140 of a plate 141 and also by bolts 142 engaging at their inner end in T slots 143 in the plate 141. The latter carries a worm 144 meshing with worm teeth 145 in plate 139 by means of which the latter is angularly adjustable in its own plane, fine and coarse scales 146 and 146$^a$ being provided, Fig. 14, for gaging such angular adjustment or tilting movement of the form. The arcuate guiding surfaces of plates 139 and 141 are arranged to produce angular movement of the form about the center of roller 136 when the latter rests on the pitch line point of the form. Plate 141 is bolted on a hub 147 rotatably carried on a spindle 147$^a$ supported at its lower end in a block 147$^b$ slidable in guides on the bed 30 along an arcuate path in extension of and concentric with that of the feed rail 45 to which the block is adjustably secured by bolts 147$^c$ on the rail working in elongated slots in the block, Fig. 3. The upper end of the spindle has a nut 148 by means of which the block and rail may be clamped together in adjusted position.

The roughing form comprises a substantially straight-edged bar 149 secured by means of screws 150 on a segmental plate 151 supported on an arcuate guide surface 152 on a block 153 and having bolts 154 sliding in T slots 155 in the block. The latter carries a worm shaft 156 meshing with worm teeth 157 in plate 151 so that the latter may be angularly adjusted or tilted in its own plane about the center of roller 136 as in the case of the finishing form above, such movement being registered on fine and coarse scales 158 and 158$^a$, respectively, as shown in Fig. 12.

Means are provided for the vertical adjustment of the roughing form into proper position relative to the finishing form for roughing out a given blank, so that the form carrier may be merely rotated on its spindle 147$^a$ to alternately present first the roughing and then the finishing form without further adjustment of these parts after being set up to the proper inclination in cutting a plurality of gears of the same dimensions.

This means comprises bearing surfaces 159 on the carrier 147 up and down which corresponding bearing surfaces on the roughing form block are slidable, the latter having an extension 160 threadedly engaging a spindle 161 rotatable in a support 162 on the form carrier. Rotation of the spindle thus raises or lowers the roughing form relative to the finishing form as may be found necessary.

In order to center the form carrier in one of its positions of rotary adjustment to bring the desired form into proper coöperation with roller 136, the carrier is provided in a flange at its bottom with notches 163 with which is adapted to engage a latch 164 spring actuated and pivotally supported on the block 147ᵇ. The latch thus centers and locks the carrier in one of its positions and may be manually withdrawn for adjustment of the latter. The form carrier is also provided on one side intermediate the forms with a pitch line gage 165 also adapted to be brought under roller 136 by rotation of the carrier. This gage is employed primarily for the purpose of maintaining the carrier in position relative to the roller during adjustment between the form carrier and feed rail and while the latter are unclamped from each other, as will later appear.

Since the tool guides are supported on opposite sides of pinion 120, their respective weights tend to counterbalance each other. It is desired, however, to produce some pressure between roller 136 and the forms to insure full and continuous contact and accurate coöperation at all times therebetween and to this end a pinion 166 meshing with the rack 119 on the upper tool guide is fixed on a spindle 167 journaled in a housing 168 carried by a bracket 169 on the fixed tool support. A coil spring 170 is secured at one end to the spindle and at its other 171 to a flange 172 on a hub 173 rotatably carried on the spindle. The hub has fixed thereon a ratchet wheel 174 with which coöperates the pawl 175 on housing 168 and the hub is provided with a nut 175ᵃ by means of which flange 172 may be rotated to place spring 170 under tension. Pawl 175 maintains the tension of the spring which is transmitted by the spindle and gear to the upper rack 119, tending to raise the latter and thereby depress the rack bar and roller 136 and press the same against the form.

The actuating means for producing the cutting movement of the tools and the feeding and indexing movements of the blank comprises a main shaft 177 rotating in bearings in the tool support and carrying at one end a stepped pulley 178 by which it may be driven. Shaft 177, Fig. 25, is supported at its inner end by the bearing 179 adjacent which the shaft has fixed thereon a gear 180 meshing with a gear 181 of a speed changing mechanism indicated generally at 182, Figs. 23 and 27, which, however, may be of any well-known or suitable construction and which forms no part of the present invention so that further description is unnecessary. This mechanism includes a shaft 183, Figs. 23 and 24, carrying at its end the pinion 184 meshing with an annular gear 185 on a flange 186 of a stub shaft 187 rotating in a bearing 188 bolted on the tool support 31. Flange 186 has formed therein a guideway 189 in which slides a block 190 carrying a wrist pin 191 on which is rotatably carried one end of a pitman or connecting rod for rotating shaft 75. Block 190 has threaded engagement with a spindle 192 supported in a bearing 193 on flange 186 and connected by means of bevel gears with a spindle 194 also rotating in the flange and by means of which the block may be adjusted longitudinally of the guideway to vary the travel of the pitman or connecting rod 195. The latter is provided with rack teeth 196, Fig. 23, meshing with a gear 197 on one end of shaft 75, the opposite end of which carries the gear 80 which reciprocates the tool carriers. As shaft 187 is rotated by the change speed mechanism, shaft 75 is oscillated at a predetermined variable speed and extent for reciprocating the tool carriers and tools.

The feed actuating means comprises a shaft 198, Figs. 25 and 27, connected by gearing with the tool driving shaft 183 of the speed changing gearing, carrying a gear 199 which through intermeshing gears 200 and 201 rotates a sleeve 202 rotatably supported by a clutch shaft 203 rotating in bearings 204 and 205 on the frame. The other end of the clutch shaft has rotatably carried thereon a sleeve 206 on which is fixed a gear 207 meshing with a gear 208 on drive shaft 177. Sleeves 202 and 206 which rotate in the same direction are spaced from each other on the shaft which has fixed thereon, between the sleeves, a bushing 210 on which is splined a slidable clutch member 211 having a groove 212 for operation by a shifting arm or fork. The adjacent ends of the sleeves are provided with clutching surfaces coöperating with similar surfaces on clutch member 211, so that by sliding the latter into coöperation with one or the other of the sleeves the latter may be alternately clutched to shaft 203. Sleeve 202 is, of course, connected by the means described, including shaft 198, with the tool driving shaft 183 so that as the speed of the latter is varied by the change speed gearing, proportional changes in speed are transmitted to sleeve 202. Sleeve 206 on the other hand is driven at a constant and somewhat higher speed by the connections described with the main driving shaft 177. The clutch shifting arm is indicated at 213 being supported on a shiftable frame 214 provided with guide surfaces 215, Fig. 27, sliding on a guide bracket 216 connected by means of an arm 217 with the machine frame. Sliding longitudinally in frame 214 is a rod 218 connected at one end by a pitman 219 with a pin 220 on a crank disk 221 fixed on one end of a shaft 222 rotating in a bearing 223 on the machine frame and having at its other end a gear 224 meshing with a pinion 225 carried by sleeve 206. By this means the constantly rotating sleeve 206 tranmits a reciprocating motion to rod 218. On the latter is secured a block 226 arranged to engage during reciprocation of the rod with one or the other of a pair of stop rods 227 sliding longitudinally, transversely of rod 218, in bearings in frame 214. Each stop rod is provided with a kerf 228 in which operates one end of a lever 229 fixed on the upper end of a horizontal shaft 230 rotating in frame 214. Shaft 230 carries also a beveled finger 231 extending upwardly into coöperation with a spring-pressed plunger 232 arranged to maintain finger 231 and shaft 230 at one side or the other of its central position so that one or the other of the stop rods is advanced into the path of movement of block 226 on reciprocating rod 218. It is apparent that engagement of the block with one of the stop rods serves to shift frame 214 in a corresponding direction, thereby shifting clutch member 211 and clutching the corresponding one of sleeves 202 and 206 to shaft 203, thereby either rotating the latter by means of gear 201 to slowly feed the blank toward the tools through suitable connections presently to be described, or rotating shaft 203 by means of gear 207 at a higher speed for withdrawing the blank from the tools preparatory to an indexing operation of the blank.

Shaft 230 carries at its outer end an arm 233 to which is pivotally secured a connecting rod 234 engaging at its opposite end with an arm on a horizontal shaft 235 rotatably supported by the main frame and provided at its outer end with a lever 236 at the ends of which are lugs 237 and 238, respectively. The latter lug is located in a plane spaced inwardly of the machine from the plane of lug 237 so that these lugs are adapted to be engaged individually by respective camming lugs 239 and 240 adjustably carried by bolts engaging in a circumferential slot 241 in a disk 242 fixed on the outer end of the transverse shaft 68 which, as previously stated, carries the feed cam 67 for oscillating the feed rail and thereby the work support. Shaft 68 has fixed thereon also the worm gear 243 with which meshes a worm 244 on a vertical shaft 244ᵃ supported in bearings on the main frame and also in a sleeve 245 at its upper end which sleeve is similarly supported on the frame by means of a bearing 246. Fixed on the upper end of shaft 244ᵃ is a bevel gear 247 meshing with a similar gear 248 on a horizontal spindle 249 rotating in a bearing on the frame and having fixed adjacent its outer end a clutch part 250. Rotatably carried on the outer end of the spindle is a housing 251 in which is a longitudinally slidable spring-pressed plunger 252 having one end formed for coöperation with the clutch collar 250. Housing 251 has upstanding ears 253 in which is pivotally supported on a pin 254 a crank 255 which may be pressed toward spindle 249 to engage the outer end of plunger 252 and slide the latter into gripping coaction with the clutch collar for manually rotating spindle 249 and shaft 244ᵃ and thereby turning the feed cam shaft 68. Normally, however, crank 255 and plunger 252 are moved to such position by the spring of the latter as to unclutch it from spindle 249. A stop screw 256 limits the outward movement of the crank and plunger.

The upper end of sleeves 245 of shaft 244ᵃ carries a gear 257 meshing with gear 258 on the end of the clutch shaft and the sleeve may be clutched to shaft 244ᵃ by means of coöperating clutch parts 259 and 259ᵃ, the latter fixed on the shaft 244 and the former splined on the sleeve. A spring 260 normally maintains the clutch parts in engagement but part 259 is formed with a groove 261 with which engages the ends 262 of a shifting lever 263 pivoted at 264 on the main frame. Lever 263 is provided with a handle for manual operation and carries a plunger 265 arranged to engage in detent openings 266 on the frame, the plunger being controlled by a trigger 267 for unlocking the lever to connect or disconnect the clutch parts.

In order to prevent interference or collision between the reciprocating tools, in case the machine is started before the tool guides are adjusted to the proper angle, or in case of excessive tilting of the tool guides in operation by improper adjustments, a means is provided for throwing out the feed whenever the tool guides swing into dangerous proximity with each other. Such means comprises bearings 268 on the machine frame, Fig. 23, in which slides a rod 269 so located that its upper end is engaged by a portion of the upper tool guide when the latter is given an excessive downward movement, the lower end of the rod being located so as to engage a lug 270 on lever 263, thus automatically actuating the latter to disconnect the clutch parts of the feeding mechanism whenever the upper tool guides move too far downwardly.

It is apparent from the above description that feed cam shaft 68 is rotated by shaft 244ᵃ and clutch shaft 203 to feed the blank toward and from the cutting tools and these sleeves are alternately connected with the clutch shaft by means of the reciprocating rod 218 and the frame 214. The shifting of frame 214 is controlled by the location of the camming lugs 239 and 240 on the feed cam shaft 68 since the rotation of the latter brings these lugs alternately into engagement with the lugs 237 and 238 of lever 236 which through the connection described moves the stop rods 227 alternately into the path of movement of the block on reciprocating rod 218. The feed cam is thus alternately rotated at a speed determined by the adjustment of the speed change gearing to feed the blank toward the tool and then rotated at a fixed speed to quickly withdraw the blank for indexing.

While the construction of the parts described, including the work and tool supports, is rigid in character it has been found preferably to provide a bracing connection between the two supports at the tops of the latter. To this end the work support has on its upper surface guideways 271 with which engage corresponding ways on a plate 272 which is thus slidably adjustable relatively to the work support to permit movement of the latter toward and from the center of the machine, the plate and support being firmly clamped together after adjustment by means of bolts 272ª. Plate 272 has an arm 272ᵇ projecting over the center of the machine and formed with a bearing carrying a spindle 273 embraced by similiar bearings on an arm 274 secured to the top of the tool support by means of bolts 275. This brace permits of convenient adjustment of the work support and when clamped to the latter after adjustment forms a rigid brace between the tops of the supports during the operation of the machine without interfering with the feeding movement of the work support toward and from the tools.

In operation, the gear blank is secured on the work spindle and the work support adjusted toward or from the center of the machine to locate the apex of the blank pitch cone at the center of the machine about which the support rotates. The tool blocks are swiveled in their guideways in the heads for proper cutting clearance, preferably each to an angle "A" or the back cone tooth angle, as indicated in Fig. 29, being the same for both roughing and finishing operations, and the tools are, of course, correctly set in their clamps for cutting along lines passing through the pitch cone apex. The tool heads are located on the carriers with reference to the work, and crank pin 191 adjusted to give the desired cutting travel. Spindle 65 is adjusted to give to the work support the predetermined angle of feeding movement corresponding to the depth of cut, which is preferably indicated by a line scribed on the blank. The form carrier block 147ᵇ is then unclamped from the feed rail 45 and the form carrier released and turned to bring the pitch line gage under roller 136 which is placed therein to hold the carrier in proper relation with the roller. The feed cam is then rotated by crank 255 to give to the feed rail its maximum movement toward the tools after which the work bed 37 is released from the feed rail and swung to bring the point of the tools to the full depth line of the teeth scribed on the blank, and the bed is then again clamped to the rail. The latter is then moved away from the tools by turning the feed cam until the indication on scale 49ª corresponds with the pitch angle of the blank, when the form carrier block is clamped to the feed rail. The finishing form corresponding to the pitch cone angle is then selected and fixed on the carrier and tilted to the back cone tooth angle A and the roughing form tilted to preferably double the back cone tooth angle 2ᴬ, as indicated in Fig. 31. With roller 136 resting on the finishing form, housing 126 is unclamped from shaft 121 and the latter rotated to tilt each tool guide to an angle B, or the pitch line tooth angle, as indicated at the top of Fig. 32, and as shown by the scales 130ª and 131, Fig. 17, and the housing and shaft are then again clamped together. With the roller then resting on the roughing form, the latter is adjusted vertically until scales 130ª and 131 show the angle for each guide of double the pitch line tooth angle, or 2ᴮ. Suitable adjustments of the indexing mechanism and speed changing gearing having been made, roller 136 may then be placed on the roughing form to rough out the teeth, and subsequently on the finishing form to complete the gear, the forms being brought alternately under the roller by rotation of the carrier as previously stated. The various parts operate in the manner described, the form being moved relatively to the roller 136 during the cutting action to control, or separate, the tool guides, as the tools reciprocate on opposite sides of a tooth to give to the faces of the latter the curvature and inclination determined by the form being used as adjusted in position on the carrier.

Figs. 32 and 33 illustrate diagrammatically the resulting effect on the profile curvature of bevel gear teeth of variations in dimensions of the gear. In Fig. 33 are shown three bevel gears G, H, and I, having progressively decreasing pitch cone angles. The teeth of these gears are shown developed in the usual manner as for spur gears having radii corresponding to the back cone radii of the respective bevel gears, and it is apparent that not only the pitch angle of the teeth of the respective gears but their profile curvature varies considerably so that it is necessary to provide a different form or templet for gears having substantially different pitch cone angles. As stated, it has been found sufficiently accurate for practical purposes to provide a limited number of forms, each having a range of several degrees, more or less, for cutting gears of the pitch cone angles usually encountered.

Fig. 32 shows three gears D, E, and F of the same pitch cone angle having, respectively, 14, 20 and 40 teeth, gears D and E having also the same diametrical pitch with a different diametrical pitch for gears E and F. The latter two gears have the same back cone radius which is different from that of gear D. With bevel gears having the same pitch cone angle but otherwise different dimensions, as in the case of gears D, E and F, the same form may be employed, corresponding to the common pitch cone angle, by varying the position of, or tilting, the form to suit the particular dimensions of each gear, thus obviating further multiplication of the number of forms beyond the limited number referred to corresponding to the varying pitch cone angles.

This follows from the fact that in gears having the same cone angle but with variations in other dimensions, as in the case of gears D, E and F above, the finishing form is developed as for a spur gear having a radius determined by the cone angle and distance of the form from the cone center of the machine, as well understood in the art, and the tooth faces are reproductions or copies of the form as a master curve. A greater or less portion of the form is employed, of course, depending upon the sum of the addendum and dedendum angles, and the movement imparted to the tools by the portion of the form used is reduced in proportion to the cone distance. The direction of curvature of the tooth face, or, in other words, the angular relation of such curvature to the median radial line of the tooth depends upon the relation between the tooth thickness and the radius of the circle on which the tooth profile is developed. In the case of teeth of standard thickness and a given pitch cone angle, it depends on the number of teeth. This angular relation of the curvature to the median line of the tooth corresponding, say to a given number of teeth, may be accurately controlled by a corresponding tilting of the same form, to vary the path of travel of the tools as they are fed into the blank, so that the same form is thus made suitable for gears of various dimensions where the cone angle remains the same. The form used for bevel gears being developed, as stated above, in the same manner as if for a spur gear, the same principle obviously applies equally well to the cutting of spur gears also, a limited number of forms being provided corresponding to the range of pitch diameters, and such forms being tilted to provide for variations in the other dimensions where the diameter remains the same.

The machine is conveniently complete in detail, automatic in operation, and fully adjustable in its parts, making it capable of turning out a wide range of variations in the gears. The manner of mounting and manipulating the forms or templets provides a relatively increased rate of production and makes possible a new and convenient method of using the finishing form reducing the number of the latter required to be provided and employed in the work.

We claim as our invention:

1. A gear cutting machine comprising a tool support and a blank support, one of which has a feeding movement relative to the other, a tool on said tool support having a cutting movement over a tooth face at one side of the horizontal central plane of the machine, and templet means controlling the tool to produce the curvature of said tooth face and adjustable to vary the angular relation of said curvature to the median radius of the tooth according to the relation between the tooth thickness and the radius of the circle on which the tooth profile is developed.

2. A gear cutting machine comprising a tool support and a blank support, one of which has a feeding movement relative to the other, a tool on said tool support having a cutting movement over a tooth face at one side of the horizontal central plane of the machine, a detachable form on the machine controlling the tool to produce curvature of the tooth face, and means for adjusting said form to vary the angular relation of said curvature to the median radial line of the tooth according to the relation between the tooth thickness and the radius of the circle on which the tooth profile is developed.

3. A gear cutting machine comprising a reciprocating tool carrier and a rotary blank support, one of which parts has a feeding movement relative to the other, a tool on the carrier arranged for cutting a tooth face spaced from the horizontal central plane of the machine, and templet means controlling the tool to produce curvature of said tooth face and adjustable to vary the angular relation between said curvature and the median radius of the tooth corresponding to the relation between the thickness of the tooth and the radius of the circle on which the tooth profile is developed.

4. A gear cutting machine comprising a reciprocating tool carrier and a rotary blank support, one of which parts has a feeding movement relative to the other, a tool on the carrier arranged for cutting a tooth face spaced from the horizontal central plane of the machine, a detachable form for imparting to the tool carrier a movement corresponding to the tooth curvature, means for tilting said form to vary the direction of said curvature relative to the median radius of the tooth, and means for rotatably indexing the blank.

5. A gear cutting machine of the form copying type comprising a blank support, a plurality of tools operating simultaneously to cut different tooth faces, form means for imparting to the tools movement corresponding to the tooth curvature, means for adjusting said form means to vary the angular relation of said curvature to the median radius of the tooth, means for indexing the blank, and operating means for said tools and indexing means.

6. A bevel gear cutting machine comprising a tool support and a blank support one of which has a feeding movement relative to the other, a tool on said tool support having a cutting movement over a tooth face spaced from the horizontal central plane of the machine, and templet means controlling the tool to produce the curvature of said tooth face corresponding to the pitch cone angle of the blank and adjustable to vary the angular relation between said curvature and the median back cone radius of the tooth, according to the relation between the tooth thickness and the radius of the circle on which the tooth profile is developed.

7. A bevel gear cutting machine comprising a tool support and a blank support one of which has a feeding movement relative to the other, a tool on said tool support having a cutting movement over a tooth face spaced from the horizontal central plane of the machine, a detachable form on the machine controlling the tool to produce curvature of the tooth face corresponding to a predetermined range of blank pitch cone angles, and means for adjusting said form to vary the angular relation of said curvature to the median back cone radius of the tooth in accordance with the number of teeth to be cut in the blank.

8. A bevel gear cutting machine comprising a tool support and a blank support one of which has a feeding movement relative to the other, a tool on said tool support having a cutting movement over a tooth face at one side of the horizontal central plane of the machine, a form controlling the tool to produce a curvature of said tooth face corresponding to the pitch cone angle of the blank and adjustable to vary the angular relation of said curvature relative to the median back cone radius of the tooth according to the number of teeth to be cut in the blank, and means for rotating the blank to index the same.

9. A bevel gear cutting machine comprising a reciprocating tool carrier and a rotary blank support one of which parts has a feeding movement relative to the other, a tool on the carrier, arranged for cutting a tooth face spaced from the horizontal central plane of the machine, and templet means controlling the tool to produce curvature of said tooth face corresponding to a range of blank pitch cone angles and adjustable to vary the angular relation of said curvature to the median back cone radius of the tooth in accordance with the number of teeth to be cut in the blank.

10. A bevel gear cutting machine comprising a tool carrier having a reciprocating movement parallel with an element of a pitch cone having its apex at the center of the machine, a tool on the carrier adjustable about an element of said cone as an axis, a rotary blank support, said support and carrier having a relative feeding movement toward and from each other about said machine center, indexing means for rotating the blank support, and an angularly adjustable form corresponding to a given blank pitch cone angle for controlling the tool to produce different angular relations of the profile curvatures of the tooth face corresponding to different numbers of teeth to be cut in the blank.

11. A bevel gear cutting machine comprising a reciprocating tool carrier, a blank support rotatable concentrically of the cone center of the machine to feed the blank, a tool on the carrier adjustable about a line passing through said cone center as an axis, guiding means for the tool to produce a curvature of the tooth corresponding to the pitch cone angle of the blank, and means for adjusting said guiding means to vary the angular relation of said curvature with the median back cone radius of the tooth in accordance with the number of teeth to be cut.

12. A bevel gear cutting machine comprising a tool carrier having a reciprocating movement parallel with an element of a pitch cone having its apex at the center of the machine, a tool on the carrier adjustable about an axis passing through the point of the tool and the pitch cone apex, a rotary blank support, said support and carrier having a relative feeding movement toward and from each other about said machine center, indexing means for the blank support, a form controlling the tool to produce a profile curvature of the tooth face corresponding to the pitch cone angle of the blank, and means for adjusting the position of said form to vary the angular relation of said curvature to the median back cone radius of the tooth in accordance with the number of teeth to be cut.

13. A bevel gear cutting machine comprising a plurality of tools movable to cut different tooth faces, a work support, said support and tools having a relative feeding movement, and guiding means for controlling the tools during the cutting action to shape the tooth profiles having an angular adjustment for varying the shape of the tooth cut.

14. A bevel gear cutting machine comprising a plurality of tools movable to simultaneously cut different tooth faces, work supporting means, said supporting means and tools having a relative feeding movement, templet means for controlling the cutting action of the tools to shape the tooth profiles, and means for angularly adjusting said templet means in the plane of its extent to vary the shape of the tooth cut.

15. A bevel gear cutting machine comprising a plurality of tools having simultaneous reciprocating movement for cutting different tooth faces, a work support, feeding means for effecting relative feeding movement of said support and tools, and angularly adjustable guiding means movable relatively to the tools for controlling the latter to shape the tooth profiles in accordance with the pitch cone angle of the blank and the number of teeth to be cut.

16. A bevel gear cutting machine comprising a plurality of tools having a simultaneous reciprocating movement for cutting different tooth faces, a blank support, said tools and support having a relative feeding movement, guiding means for the tools for producing a curvature of the tooth faces corresponding to a predetermined range of blank pitch cone angles, and means for adjusting said guiding means to vary the angular relation of said curvature to the median back cone radius of the tooth in accordance with the number of teeth to be cut.

17. A gear cutting machine comprising a plurality of tools having a reciprocating movement for simultaneously cutting different tooth faces, a blank support, said tools and support having a relative feeding movement, and selective templet means angularly adjustable in the plane of extent thereof for controlling the tools to produce profile curvature of said tooth faces corresponding to the relation between the tooth thickness and the radius of the circle on which said curvature is developed.

18. A bevel gear cutting machine comprising a plurality of tools having a reciprocating movement for simultaneously cutting different tooth faces, a blank support, said tools and support having a relative feeding movement, means for adjusting said tools about an element of the pitch cone of the blank as an axis, adjustable guiding means for the tools for producing profile curvature of said tooth faces corresponding to the pitch cone angle of the blank, and means for tilting said guiding means about an axis transverse to the direction of extent thereof to vary the angular relation of said tooth face curvature to the median back cone radius of the tooth in accordance with the number of teeth to be cut.

19. A bevel gear cutting machine comprising a plurality of tools having a reciprocating movement for simultaneously cutting different tooth faces, a blank support, said tools and support having a relative feeding movement, means for adjusting said tools about an element of the pitch cone of the blank as an axis, guiding means for the tools for producing profile curvature of said tooth faces corresponding to the pitch cone angle of the blank, and means for adjusting said guiding means to vary the angular relation of said curvature to the median back cone radius of the tooth in accordance with the number of teeth to be cut.

20. A bevel gear cutting machine comprising a pair of tools having a reciprocating movement for simultaneously cutting different tooth faces, a blank support, said tools and support having a relative feeding movement, a movable form controlling both tools for copying tooth profiles corresponding to the pitch cone angle of the blank, and means for adjusting said form to vary said tooth shape in accordance with the number of teeth to be cut.

21. A bevel gear cutting machine comprising a pair of tools having a reciprocating movement for simultaneously cutting different tooth faces, a blank support, said tools and support having a relative feeding movement toward and from each other about a vertical axis passing through the apex of the blank pitch cone, a movable templet controlling both tools for copying tooth profiles corresponding to the pitch cone angle of the blank, and means for adjusting said templet angularly about a horizontal axis passing through said vertical axis for varying the angular relation of the curvature of the tooth face relative to the median line of the tooth in accordance with the number of teeth to be cut.

22. A bevel gear cutting machine comprising a rotary blank support, a pair of tools having a reciprocating movement toward and from the apex of the pitch cone of the blank to cut opposite faces of a tooth, said support and tools having a relative feeding movement about said cone apex, means for indexing the blank, a form movable relatively to the tools and controlling the latter for producing a tooth profile corresponding to the pitch cone angle of the blank, and means for adjusting said form to vary the tooth shape in accordance with the number of teeth to be cut.

23. A bevel gear cutting machine comprising a rotary blank support, a pair of tools having a reciprocating movement toward and from the apex of the pitch cone of the blank to simultaneously cut different tooth faces, means for swinging said blank support about said cone apex to feed the blank toward and from the tools, indexing means for the blank, guiding means actuated by said feeding means and controlling the tools for shaping the tooth faces to correspond with the pitch cone angle of the blank, and means for adjusting said guiding means to vary the shape of the tooth in accordance with the number of teeth to be cut.

24. A bevel gear cutting machine comprising a rotary blank support, a pair of tools having a reciprocating movement toward and from the apex of the pitch cone of the blank to simultaneously cut different tooth faces, means for swinging said blank support about said cone apex to feed the blank toward and from the tools, indexing means for the blank, a templet movable by said feeding means and controlling said tools for shaping the tooth faces to correspond with the pitch cone angle of the blank, and means for angularly adjusting said templet to vary the shape of the tooth in accordance with the number of teeth to be cut.

25. A bevel gear cutting machine comprising a rotary blank support, a pair of tools having a reciprocating movement toward and from the apex of the pitch cone of the blank to simultaneously cut different tooth faces, means for adjusting the tools angularly about an element of the pitch cone of the blank as an axis, feeding means for swinging the blank support about the pitch cone apex toward and from the tools, indexing means for the blank, a templet movable by said feeding means and controlling the tools for shaping the tooth faces to correspond with the pitch cone angle of the blank, and means for adjusting said templet angularly about an axis substantially perpendicular to the direction of its movement to vary the shape of the tooth in accordance with the back cone pitch angle of the teeth to be cut.

26. A bevel gear cutting machine comprising a rotary blank support, a pair of tools having a reciprocating movement toward and from the apex of the pitch cone of the blank to cut opposite faces of a tooth, said support and tools having a relative feeding movement about said cone apex, means for indexing the blank, a form carrier movable relatively to the tools, a roughing form adjustably supported on said carrier, a finishing form on the carrier for shaping the tooth faces to correspond with the pitch cone angle of the blank having an adjustment for varying the shape of the tooth in accordance with the number of teeth cut, and means for connecting said forms alternately with the tools for controlling the latter.

27. A bevel gear cutting machine comprising a rotary blank support, a pair of tools having a reciprocating movement toward and from the apex of the pitch cone of the blank to simultaneously cut different tooth faces, means for swinging said blank support about said cone apex to feed the blank toward and from the tools, indexing means for the blank, a form carrier actuated by said feeding means and movable to present roughing and finishing forms alternately for coöperation with the tools to control the latter, and means for adjusting said forms to vary the angular relation of the tooth face curvature to the median back cone radius of the tooth in accordance with the number of teeth to be cut.

28. A bevel gear cutting machine comprising a blank support, a tool support, a pair of tool carriers having a reciprocating movement on said support toward and from the apex of the pitch cone of the blank and also a pivotal movement toward and from each other about a line passing through said apex as an axis, feeding means for moving the blank and tool supports toward and from each other, selective form means controlling said pivotal movement of the carriers to shape the tooth profile according to the pitch cone angle of the blank, and means for adjusting the position of said form means to vary the tooth shape in accordance with the number of teeth to be cut.

29. A bevel gear cutting machine comprising a blank support, a tool support, a pair of tool carriers having a reciprocating movement on said support toward and from the apex of the pitch cone of the blank and also a pivotal movement toward and from each other about a line passing through said apex as an axis, tools on said carriers adjustable about an element of said pitch cone as an axis, feeding means for moving the blank and tool supports toward and from each other, and selective form means controlling said pivotal movement of the carriers to shape the tooth profile according to the pitch cone angle of the blank having an angular adjustment to vary the inclination thereof in accordance with the number of teeth to be cut.

30. A bevel gear cutting machine comprising a blank support, a tool support, a pair of tool carriers having a reciprocating movement on said support toward and from the apex of the pitch cone of the blank and also a pivotal movement toward and from each other about a line passing through said apex as an axis, feeding means for moving the blank and tool supports toward and from each other, a form carrier actuated relatively to said tool carriers by said feeding means and movable to bring roughing and finishing forms selectively into coöperation with said carriers to control the tools, and adjusting means for the finishing form to vary the inclination thereof in accordance with the number of teeth to be cut.

31. A bevel gear cutting machine comprising a blank support, a tool support, a pair of tool carriers having a reciprocating movement on said support toward and from the apex of the pitch cone of the blank and also a pivotal movement toward and from each other about a line passing through said apex as an axis, feeding means for moving the blank and tool supports toward and from each other, manually operable means effecting said pivotal movement of the carriers and for securing the latter in pivotally adjusted positions, and form means automatically controlling said pivotal movement of the carriers during the cutting operation to shape the tooth profiles according to the pitch cone angle of the blank, having an angular adjustment to vary the position thereof in accordance with the number of teeth to be cut.

32. A bevel gear cutting machine comprising a pair of tools having a reciprocating movement for simultaneously cutting different tooth faces, actuating means for reciprocating said tools, a blank support, feeding means for moving said tools and support toward and from each other, operating means for varying the amplitude and speed of said reciprocating and feeding movements, guiding means controlling the tools for producing a tooth face curvature corresponding to a predetermined range of pitch cone angles, and means for adjusting the position of said guiding means to vary the angular relation of said curvature to the median back cone radius of the tooth in accordance with the number of teeth to be cut.

33. A bevel gear cutting machine comprising a blank support, a tool support, a pair of tool carriers having a reciprocating movement on said support toward and from the apex of the pitch cone of the blank and also a pivotal movement toward and from each other about a line passing through said apex as an axis, feeding means for moving the blank and tool supports toward and from each other, a templet shaped to correspond with the pitch cone angle of the blank, a follower coöperating with the templet, said templet and follower having a relative movement effected by said feeding means, gearing connecting said templet and follower with said carriers to effect said pivotal movement thereof in accordance with the shape of said templet, and means for varying the position of said templet to vary the shape of the tooth in accordance with the number of teeth to be cut.

34. A bevel gear cutting machine comprising a blank support, a tool support, a pair of tool carriers having a reciprocating movement on said support toward and from the apex of the pitch cone of the blank and also a pivotal movement toward and from each other about a line passing through said apex as an axis, feeding means for moving the blank and tool supports toward and from each other, templet means controlling said pivotal movement of the tool carriers to produce curvature of the tooth faces corresponding to the pitch cone angle and number of teeth cut in the blank, and means for automatically disconnecting said feeding means upon excessive pivotal movement of the carrier to prevent interference between said reciprocating tools.

35. A bevel gear cutting machine comprising a blank support, a tool support, a pair of tool carriers having a reciprocating movement on said support toward and from the apex of the pitch cone of the blank and also a pivotal movement toward and from each other about a line passing through said apex as an axis, feeding means for moving the blank and tool supports toward and from each other, a form actuated by said feeding means for controlling said pivotal movement of the tool carriers, a rack having a follower coöperating with said form, a rack connected with each of said tool carriers, and gearing interposed between said form rack and carrier racks for actuating the carriers.

36. A bevel gear cutting machine comprising a blank support, a tool support, guides on said tool support having pivotal movement about an axis passing through the apex of the blank pitch cone, tool carriers having a reciprocating movement on said guides, feeding means for moving said blank and tool supports toward and from each other, indexing means for the blank, tool controlling means comprising a form and a follower therefor actuated relatively to each other by said feeding means, segmental racks on said guides, a member connected with said tool controlling means, gearing connecting said member and guide racks, and means for varying the position of said form to variably control the tools in accordance with the number of teeth to be cut in the blank.

ARTHUR L. STEWART.
ERNEST C. HEAD.